(12) United States Patent
Thullier

(10) Patent No.: US 10,017,046 B2
(45) Date of Patent: Jul. 10, 2018

(54) DEVICE FOR CONTROLLING THE FLOW RATE OF A FLOW OF AIR FOR A MOTOR VEHICLE

(71) Applicant: Valeo Systemes Thermiques, Le Mesnil Saint Denis (FR)

(72) Inventor: Christophe Thullier, Montigny-le-Bretonneux (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 114 days.

(21) Appl. No.: 14/917,116

(22) PCT Filed: Sep. 9, 2014

(86) PCT No.: PCT/EP2014/069209
§ 371 (c)(1),
(2) Date: Mar. 7, 2016

(87) PCT Pub. No.: WO2015/032987
PCT Pub. Date: Mar. 12, 2015

(65) Prior Publication Data
US 2016/0193911 A1 Jul. 7, 2016

(30) Foreign Application Priority Data
Sep. 9, 2013 (FR) ...................................... 13 58638

(51) Int. Cl.
*B60K 11/08* (2006.01)
*B60K 11/06* (2006.01)

(52) U.S. Cl.
CPC ............ *B60K 11/085* (2013.01); *B60K 11/06* (2013.01); *Y02T 10/88* (2013.01)

(58) Field of Classification Search
CPC .............................. B60K 11/085; B60K 11/06
USPC ........................................................... 454/155
See application file for complete search history.

(56) References Cited

U.S. PATENT DOCUMENTS

| | | | |
|---|---|---|---|
| 2012/0019025 A1* | 1/2012 | Evans ................. | B60K 11/085 296/193.1 |
| 2012/0067655 A1* | 3/2012 | Charnesky .......... | B60K 11/085 180/68.1 |
| 2014/0073233 A1* | 3/2014 | Schmitt ................ | B60K 11/085 454/143 |

FOREIGN PATENT DOCUMENTS

| | | |
|---|---|---|
| DE | 3929023 C1 | 9/1990 |
| EP | 2335963 A1 | 6/2011 |

OTHER PUBLICATIONS

International Search Report issued in corresponding application No. PCT/EP2014/069209 dated Dec. 2, 2015 (4 pages).
(Continued)

*Primary Examiner* — Steven B McAllister
*Assistant Examiner* — Allen Schult
(74) *Attorney, Agent, or Firm* — Osha Liang LLP

(57) ABSTRACT

The invention relates to a device (1) for controlling the flow rate of a flow of air F for a motor vehicle, in particular for a front face of the motor vehicle, comprising a plurality of flaps (3) for controlling the flow rate of said flow of air F, said flaps being mounted in a rotational manner on a holder (5) of said device. Said flaps (3) have a rear overlap extending from one flap to another, in the closed position of the flaps, so as to allow said flaps to open under the action of a negative pressure D behind said device (1).

11 Claims, 1 Drawing Sheet

(56) References Cited

OTHER PUBLICATIONS

Written Opinion of the International Searching Authority issued in corresponding application No. PCT/EP2014/069209 dated Dec. 2, 2015 (5 pages).

* cited by examiner

DEVICE FOR CONTROLLING THE FLOW RATE OF A FLOW OF AIR FOR A MOTOR VEHICLE

The invention relates to a device for controlling the flow rate of a flow of air for a motor vehicle, and a ventilation duct of the vehicle provided with such a device for controlling the flow rate of a flow of air.

Vehicles with heat engines need to discharge the calories generated by their operation and, for that, they are equipped with heat exchangers, notably cooling radiators, which are placed at the front of the vehicle and which are passed through by outside air. To force the circulation of this air through the exchanger(s), a fan is placed upstream or downstream thereof, upstream or downstream, in this document, being judged with reference to the airflow direction.

It is known practice to use controlled flaps between a grille of the vehicle and the fan to block or limit the flow of air in certain conditions. These flaps are arranged horizontally across the flow and can be either open allowing the maximum of air to pass, or more or less closed in order to then block, partially or entirely, the flow of air.

These flaps are commonly produced in the form of coplanar rectangular plates extending along a median axis of rotation and which are secured to a lever controlling the opening or closure. This lever is linked to a rod, which is itself actuated via an actuator driven by a power cylinder or an electric motor. Nevertheless, in case of failure of the flap opening control, for example in case of failure of the power cylinder or of failure of the electric motor power supply, in the closed position of the flaps, the engine of the vehicle is no longer cooled and its temperature can become critical.

The present invention aims to mitigate this drawback.

To this end, the subject of the invention is a device for controlling the flow rate of a flow of air for a motor vehicle, notably for a front face of the motor vehicle, comprising a plurality of flaps for controlling the flow rate of said flow of air, mounted to rotate on a support of said device, said flaps being provided with a rear overlap extending from one to the other of said flaps, in the closed position of the flaps, so as to allow said flaps to open under the action of a negative pressure present behind said device.

Said negative pressure is notably generated by a fan, in particular a fan arranged behind said flaps.

The fan generates a negative pressure of the order of 100 bar on the flaps. In a conventional design, this negative pressure is insufficient to open the flaps because the torques exerted on each of the rear parts of the flap are neutralized. With the invention, the torque exerted on one of the rear parts of the flap is favored and the flap can open, by managing to overcome the return torque or torques, for example exerted by gravity, friction and/or the holding torque of the actuator.

Thus, in case of failure of the flap opening control, in the closed position of the flaps, the heating engine of the vehicle triggers the fan which starts up and generates a negative pressure to open the flaps. The engine of the vehicle can then be cooled by the flow of air passing through said device forced into the open position of the flaps.

The invention will also be able to have the following features, taken alone or in combination:
- said flaps are of longitudinal form, for example of rectangular form,
- said flaps have a front overlap relative to one another insensitive to the pressure, in the closed position of the flaps, such that an incident flow of air, notably originating from the movement of the vehicle, has no effect to open the flaps,
- said flaps comprise an axis of rotation, in particular extending in the direction of their longitudinal form,
- said flaps comprise so-called outer front surfaces, intended to be exposed to the incident flow of air, in the closed position of the flaps, said outer front surfaces being arranged on either side of said axis of rotation so as to be equivalent in size, such that the incident flow of air creates torques that neutralize one another on said outer front surfaces of the flaps,
- said flaps comprise rear surfaces, called outer surfaces, intended to be exposed to said negative pressure, in the closed position of the flaps, said outer rear surfaces being arranged on either side of said axis of rotation so as to be different in size, such that said negative pressure generates a rotational torque provoking the opening of the flaps,
- said flaps overlap one another, in the closed position of the flaps, such that, relative to said axis of rotation, a lower part of one overlaps a substantial part of an upper part of the other, even all of the upper part of the other,
- said overlapping parts are pressed flat onto one another,
- said overlapping parts have a setback of one overlapping an edge of the other,
- said axis of rotation of a flap is situated in proximity to the rear edge of the neighboring flap, in the closed position of the flaps,
- said device comprises means for controlling the opening/closure of the flaps,
- said control means are of the type comprising a rod linked to said flaps, which is itself actuated via an actuator, for example driven by an electric motor,
- the control means are configured to ensure that the flaps are held in the closed position, in normal operation of said control means, despite said rear negative pressure,
- said device is configured to allow the flaps to open in case of failure of said control means, notably of their electrical power supply, in other words said rotational torque provoking the opening of the flaps facing said negative pressure is greater than a torque for holding the flaps in the closed position in case of failure of said control means,
- said device comprises a return spring on the opening of the flaps increasing said rotational torque provoking the opening of the flaps.

The invention relates also to a ventilation duct comprising said device for controlling the flow rate of a flow of air for a motor vehicle.

Said ventilation duct is intended to be advantageously arranged at the front face of the vehicle, in particular facing a front grille opening of the vehicle.

Said negative pressure is notably triggered in case of failure of said control means.

Said negative pressure is generated by a fan, notably associated with said ventilation duct. Said fan will be able to be configured to generate a flow of air intended to pass through heat exchangers located downstream of the duct.

The invention will be better understood, and other aims, details, features and advantages thereof will become more clearly apparent from the following detailed explanatory description of an embodiment of the invention given as a purely illustrative and nonlimiting example, with reference to the attached schematic drawings.

IN THESE DRAWINGS

Figure 1:
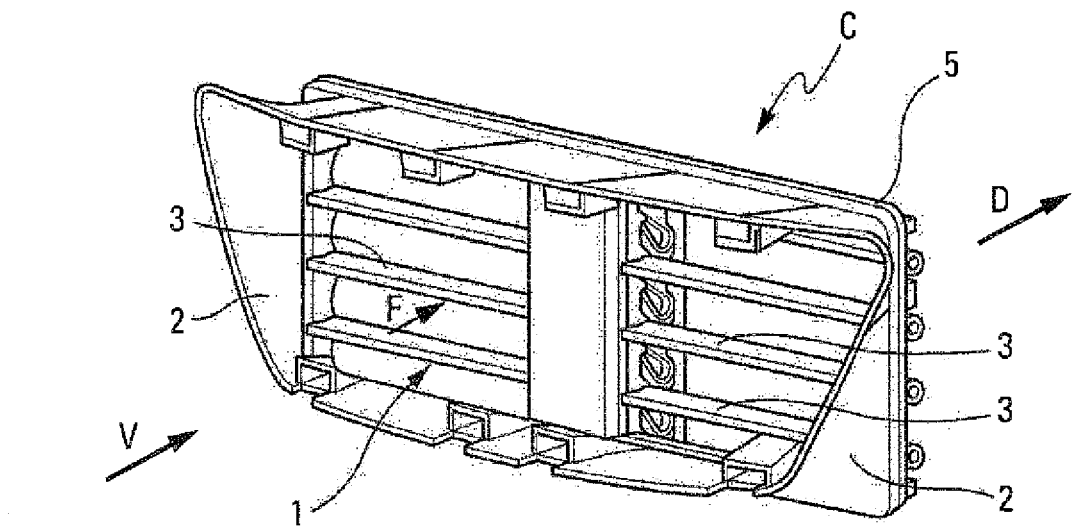
FIG. 1 is a perspective view of a front face ventilation duct of a motor vehicle according to an embodiment of the invention.

Referring to the drawings, the invention relates to a control device 1 controlling the flow rate of a flow of air F for a motor vehicle, notably for a front face of the motor vehicle. This device 1 is here mounted on a ventilation duct C. It comprises a plurality of flaps 3 for controlling the flow rate of said flow of air F, mounted to rotate on a support of said device, here a frame 5 intended to be mounted on a chassis of the vehicle.

Said device 1 comprises means for controlling the opening/closure of the flaps, not represented. These control means can be of the type comprising a rod linked to said flaps 3, which is itself actuated via an actuator, notably driven by an electric motor.

This device is, for example, intended to cool equipment of the vehicle, not represented, such as heat exchangers, notably cooling radiators or heat exchangers of a heating and/or air conditioning loop for the vehicle interior, which are placed at the front of the vehicle and which are passed through by said flow of air.

Figure 2:
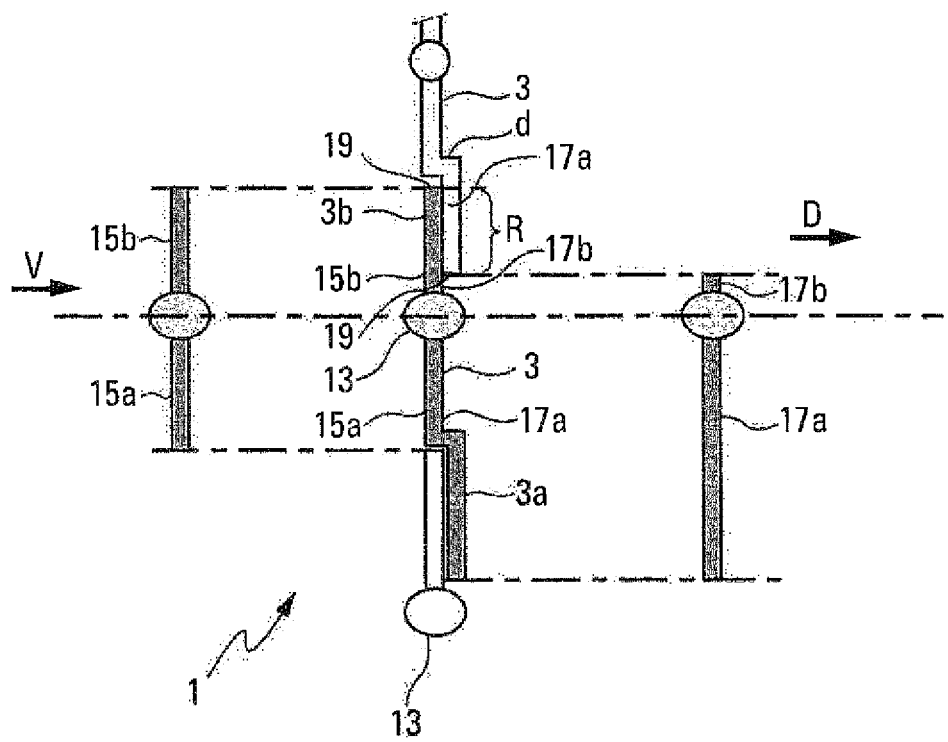
FIG. 2 is a schematic view in partial cross section of the ventilation duct according to FIG. 1.

According to the invention, as illustrated in FIG. 2 in which only two flaps 3 are represented, the flaps 3 are provided with a rear overlap R, in the closed position of the flaps, extending from one to the other of the flaps, so as to allow said flaps to open under the action of a negative pressure D, indicated by an arrow, present behind said device.

Said negative pressure D is notably generated by a fan, not represented, arranged behind said flaps. This negative pressure is advantageously exerted transversely to the flaps in the position of closure in the direction of the arrow. It is notably implemented in case of failure of said means for controlling the opening/closure of the flaps, in the closed position of the flaps, when the engine of the vehicle heats up. The engine of the vehicle can then be cooled by the flow of air F passing through said device forced into the open position of the flaps.

According to the example, the flaps 3 are of longitudinal form, for example of rectangular or near-rectangular form. They are advantageously of constant thickness, such that their weight is distributed uniformly over their entire surface area.

As illustrated in particular in FIG. 2, these flaps will be able to have a front overlap from one to the other of the flaps. Said overlap is insensitive to the pressure, in the closed position of the flaps, such that the movement of the vehicle has no effect to open the flaps. In effect, these flaps comprise an axis of rotation 13, extending in the direction of their longitudinal form, here in the median part of their surface area. They notably comprise front surfaces 15a, 15b, called outer surfaces, exposed to the incident flow of air V in the closed position of the flaps, for example the relative flow of air at the front of the vehicle when the latter is moving. These outer front surfaces are opposite to said negative pressure D. The outer front surfaces 15a, 15b of a flap which are arranged on either side of said axis of rotation 13 are equivalent in size, such that the incident flow of air creates flap opening torques that neutralize one another on each of them. Thus, the incident flow of air has no effect on the opening of the flaps.

According to an important feature of the invention, the flaps 3 comprise rear surfaces, called outer surfaces. The outer rear surfaces exposed to said negative pressure 17a, 17b of a flap, in the closed position of the flaps, which are arranged on either side of said axis of rotation 13, are different in size, such that said negative pressure generates a rotational torque on the flap in the direction of opening of the flaps. This difference is schematically presented to the right of the two flaps 3 in FIG. 2.

Notably, said flaps overlap one another, according to said overlap R, such that, relative to said axis of rotation, a lower part 3a of one overlaps a substantial part of the upper part 3b of the other, even all of the upper part 3b of the other. The effect of the negative pressure in opening the flaps is all the greater when the overlap R of the flaps is greater.

Said overlapping flap parts 3a, 3b are advantageously pressed flat onto one another, in particular transversely to the negative pressure, as here, which gives the full effect of the negative pressure on the flaps.

They are notably provided with a setback d of one overlapping an edge 19 of the other. The overlap is thus relatively tight to any leaks of flow F between the flaps.

Said axis of rotation 13 of a flap can, as here, be situated in proximity to the rear edge 19 of the neighboring flap.

Said device can further be configured to ensure that the flaps are held in the closed position, in normal operation of said control means, such that the flaps do not open despite said rear negative pressure.

More particularly, according to the invention, the device is configured to allow the flaps to open in case of failure of said control means, notably of their electrical power supply, here of the electrical power supply of the actuator. This opening of the flaps is a safety measure for the vehicle, notably with respect to the cooling of the engine of the vehicle.

Said rotational torque opening the flaps faced with said negative pressure, triggered in this case, is in particular greater than a torque for holding the flaps in the closed position, for example the return torque due to gravity and/or the frictional resisting torque resisting the rotation of the flaps from the closed position to the open position. Said rotational torque, applied to the axis 13, is able to overcome said resisting torque, applied in the opposite direction to the axis 13, and therefore to make it possible to open the flaps in case of failure of said control means.

Said device can comprise a flap opening return spring, not represented, increasing said rotational torque in opening the flaps.

The invention relates also to the ventilation duct C comprising said device 1 for controlling the flow rate of a flow of air for a motor vehicle, as illustrated in FIG. 1. The duct comprises an outer channel 2, of a form substantially converging toward the flaps from the upstream direction. Said channel is configured to join, upstream, a radiator grille (not represented) intended to prevent any introduction of foreign bodies; it bears, downstream, the device with its series of flaps 3 positioned parallel one above the other. The latter are notably arranged in such a way that, in the closed position, they block the opening of the duct.

This ventilation duct C can incorporate the grille 5 of the vehicle, upstream of the device, and said fan downstream of the device, which will be able to be linked notably to said flap control means to allow said negative pressure to be triggered in case of failure of the control means. Such triggering will also be able to be provoked by a unit monitoring the engine of the vehicle.

The invention thus relates to a simple solution for allowing for a safe cooling of members of a motor vehicle, notably through a front face of a vehicle.

The invention claimed is:

1. A device for controlling the flow rate of a flow of air for a front face of a motor vehicle, comprising:
    a plurality of flaps for controlling the flow rate of said flow of air, mounted to rotate on a support of said device, said flaps being provided with a rear overlap extending from one to the other of said flaps, in the closed position of the flaps, to allow said flaps to open under the action of a negative pressure present behind said device,
    wherein said flaps comprise:
        an axis of rotation,
        outer front surfaces, exposed to an incident flow of air, in the closed position of the flaps, said outer front surfaces being arranged on either side of said axis of rotation to be equivalent in size, such that the incident flow of air creates torques that neutralize one another on said outer front surfaces, and outer rear surfaces, exposed to said negative pressure, in the closed position of the flaps, said outer rear surfaces being arranged on either side of the axis of rotation to be different in size, such that said negative pressure generates a rotational torque that opens the flaps.

2. The control device as claimed in claim 1, in which said negative pressure is generated by a fan.

3. The control device as claimed in claim 1, wherein said flaps overlap one another such that, relative to said axis of rotation, a lower part of one flap overlaps at least a portion of an upper part of the other flap.

4. The control device as claimed in claim 3, in which said overlapping parts are pressed flat onto one another.

5. The control device as claimed in claim 3, in which said parts have an overlap with a setback of one part overlapping an edge of the other part.

6. The control device as claimed in claim 1, in which said axis of rotation of a flap is situated in proximity to a rear edge of a neighboring flap.

7. The control device as claimed in claim 1, comprising means for controlling the rotation of the flaps.

8. The control device as claimed in claim 7, in which the control means are configured to ensure that the flaps are held in the closed position, in normal operation of said control means, despite said rear negative pressure.

9. The control device as claimed in claim 7, configured to allow the flaps to open in case of failure of said control means.

10. The control device as claimed in claim 1, comprising a return spring increasing said rotational torque provoking the opening of the flaps.

11. A ventilation duct comprising a device for controlling the flow rate of a flow of air for a motor vehicle as claimed in claim 1.

* * * * *